United States Patent
Atluri et al.

(10) Patent No.: US 8,521,119 B2
(45) Date of Patent: Aug. 27, 2013

(54) METHOD AND APPARATUS FOR AN EQUALIZED ON-DIE TERMINATION (ODT) CIRCUIT

(75) Inventors: Suresh Atluri, Duluth, GA (US); Liang Leon Zhang, Duluth, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 13/114,960

(22) Filed: May 24, 2011

(65) Prior Publication Data

US 2012/0302194 A1    Nov. 29, 2012

(51) Int. Cl.
*H04B 1/16*    (2006.01)
(52) U.S. Cl.
USPC ........................................ 455/343.1

(58) Field of Classification Search
None
See application file for complete search history.

(56) References Cited

U.S. PATENT DOCUMENTS

| | | | | |
|---|---|---|---|---|
| 5,528,168 A | * | 6/1996 | Kleveland | 326/30 |
| 5,726,583 A | * | 3/1998 | Kaplinsky | 326/30 |
| 6,351,138 B1 | | 2/2002 | Wong | |
| 6,411,122 B1 | | 6/2002 | Mughal et al. | |
| 7,477,704 B1 | * | 1/2009 | Cornelius | 375/316 |

* cited by examiner

*Primary Examiner* — Crystal L Hammond
(74) *Attorney, Agent, or Firm* — Heimlich Law, PC; Alan Heimlich, Esq.

(57) ABSTRACT

A method and apparatus for an equalized On-Die Termination (ODT) circuit uses timed switching to reduce receiver power consumption.

2 Claims, 9 Drawing Sheets

← 800

1. An apparatus comprising:
   a receiver having a input and an output;
   a first termination impedance having a first input and a second input, said first input coupled to said receiver input, and said second input coupled to a positive power supply;
   a second termination impedance having a first input and a second input, said first input coupled to said receiver input, and said second input coupled to a power supply of lower voltage than said positive power supply;
   said first termination impedance in communication with said receiver output; and
   said second termination impedance in communication with said receiver output.

2. The apparatus of claim 1 wherein said first termination impedance has a control input, said control input coupled to said receiver output.

3. The apparatus of claim 2 wherein said second termination impedance has a control input, said control input coupled to said receiver output.

4. The apparatus of claim 3 wherein said first termination impedance changes impedance when said receiver input approaches said positive power supply.

5. The apparatus of claim 4 wherein said second termination impedance changes impedance when said receiver input approaches said power supply of lower voltage than said positive power supply.

6. The apparatus of claim 2 further comprising a first delay block having an input and an output, said first delay block input coupled to said receiver output, and said first delay block output coupled to said first termination impedance control input.

7. The apparatus of claim 6 further comprising a second delay block having an input and an output, said second delay block input coupled to said receiver output, and said second delay block output coupled to said second termination impedance control input.

8. A method comprising sensing a state of a receiver input and based on said sensing controlling an impedance coupled to said receiver input.

9. The method of claim 8 wherein said controlling controls two impedances coupled to said receiver input based upon said state.

10. The method of claim 9 wherein one of said two impedances is coupled to a positive supply voltage.

11. The method of claim 10 wherein another one of said two impedances is coupled to a ground potential supply voltage.

12. The method of claim 10 wherein another one of said two impedances is coupled to a negative supply voltage.

13. A method comprising:
  terminating a receiver input to a positive potential through a first controllable impedance;
  terminating said receiver input to a ground potential through a second controllable impedance;
  communicating a receiver output to said first controllable impedance; and
  communicating said receiver output to said second controllable impedance.

14. The method of claim 13 wherein said communicating a receiver output to said first controllable impedance is coupling directly said receiver output to a control input on said first controllable impedance.

15. The method of claim 4 wherein said communicating a receiver output to said second controllable impedance is coupling directly said receiver output to a control input on said second controllable impedance.

16. The method of claim 13 wherein said communicating a receiver output to said first controllable impedance is coupling through a first time delay block said receiver output to a control input on said first controllable impedance.

17. The method of claim 16 wherein said communicating a receiver output to said second controllable impedance is coupling through a second time delay block said receiver output to a control input on said second controllable impedance.

18. The method of claim 17 wherein said first time delay block and said second time delay block provide different time delays.

19. The method of claim 17 wherein said first time delay block provides a first time delay substantially equal to a bit interval minus a delay due to said receiver and minus a first delay due to said first controllable impedance.

20. The method of claim 19 wherein said second time delay block provides a second time delay substantially equal to said bit interval minus said delay due to said receiver and minus a second delay due to said second controllable impedance.

FIG. 9

METHOD AND APPARATUS FOR AN EQUALIZED ON-DIE TERMINATION (ODT) CIRCUIT

RELATED APPLICATION

This application is related to Application No. 13/114,970 filed this same date titled "Method and Apparatus for A Low Power AC On-Die-Termination (ODT) Circuit", which is hereby incorporated herein by reference in its entirety including all incorporated references therein.

FIELD OF THE INVENTION

The present invention pertains to on die (also denoted on-die) termination. More particularly, the present invention relates to a Method and Apparatus for An Equalized On-Die Termination (ODT) Circuit.

BACKGROUND OF THE INVENTION

FIG. 3 illustrates an example of a high-speed communication platform with drivers, receivers, and channels. Signals are launched from drivers to the receivers through T-lines on, for example, an FR4 board. The driver outputs are at the near-end of the T-lines and the receiver inputs are at the far-end. ODT circuits where are located at the receiver end which help in reducing the signal reflections and improve signal integrity.

In high-speed data transfer designs, ODT is used on the receiver end to minimize reflections and improve signal integrity. Often high-speed ODT designs are simple passive resistors which result in constant DC power. This DC power turns out to be significant especially in dual-data rate3 (DDR3) applications due to the fact that there are a large number of I/O's. This presents a problem.

BRIEF DESCRIPTION OF THE DRAWINGS

The invention is illustrated by way of example and not limitation in the figures of the accompanying drawings in which:

FIG. 8 shows various embodiments of the invention; and

FIG. 9 shows various embodiments of the invention.

DETAILED DESCRIPTION

In one embodiment of the invention, ODT is used on the receiver end to minimize reflections and improve signal integrity while reducing the DC power dissipation in the ODT circuits without adversely impacting the signal integrity of the system.

In one embodiment of the invention, receiver equalization to reduce DC power dissipation in the ODT circuits in implemented by doubling the termination resistance and switching the termination to the appropriate power/ground bus.

Figure 4:
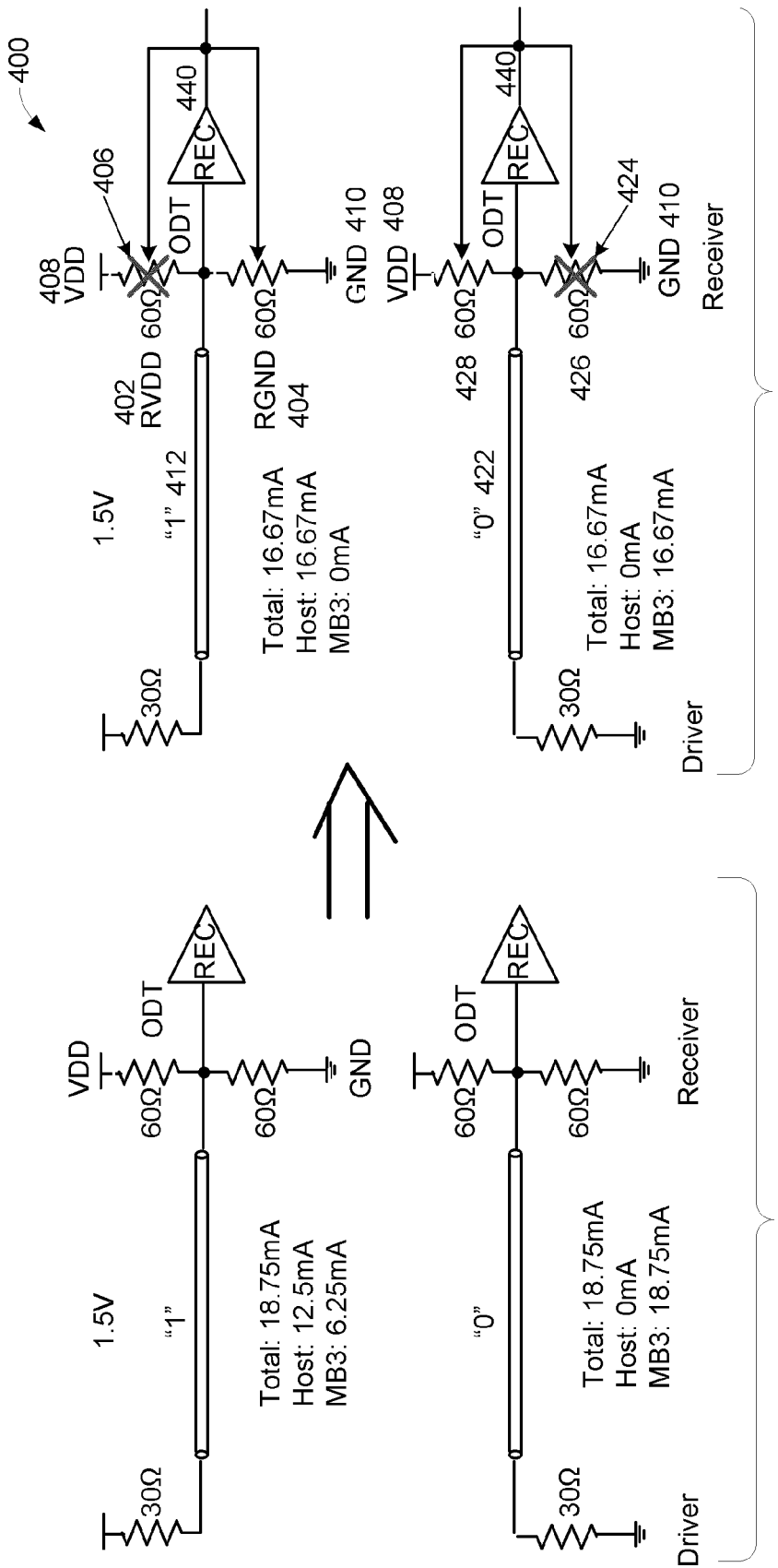
FIG. 4A and FIG. 4B illustrate a simple version of a schematic to implement one embodiment of the invention via an equalization based ODT modification technique.

FIG. 4B, illustrates generally at 400, one embodiment of the invention showing a simple version of a schematic to implement one of the proposed equalization based ODT modification techniques.

FIG. 4A is an example scheme, that is presented here for comparison with one embodiment of the invention FIG. 4B, the example is typically used in high-speed data transfer, where in the receiver end, an on-die termination is implemented by connecting passive resistors connected to power and ground supplies. As shown in FIG. 4A, for example, the total current consumption for a '1' or '0' transfer for driver and ODT strength of 30 Ohms with a power supply of 1.5V is 18.75 mA.

FIG. 4B is one embodiment of the invention showing a simple schematic implementation. Initially, the resistors (RVDD 402 and RGND 404) are connected to both power and ground supplies (VDD 408 and GND 410). When the receiver detects a '1' 412, the resistor (RVDD 402) connected to VDD 408 is disabled (at 402 X through RVDD 402), leaving only the resistor (RGND 404) connected to GND 410 enabled. In this process, the termination is ready for the next incoming '0' bit, while still preserving the current data bit '1' as long as the driver and ODT impedances are the same. Similarly, if the receiver detects a '0' 422, the resistor 426 connected to GND is disabled (at 424 X through resistor), leaving only the resistor 428 connected to VDD enabled. In this process, the termination is ready for the next incoming '1' bit, while still preserving the current data bit '0' as long as the driver and ODT impedances are the same. As shown in the calculations, this scheme results in a total power reduction of 11%.

In one embodiment of the invention the resistors (RVDD 402 and RGND 404) a shown in FIG. 4B are controllable electronic devices having, for example, control inputs that are coupled and/or in communication with the receiver output 440. For example, 402 and 404 may be MOSFET devices and 440 may connect to the gates of these devices.

Figure 5:
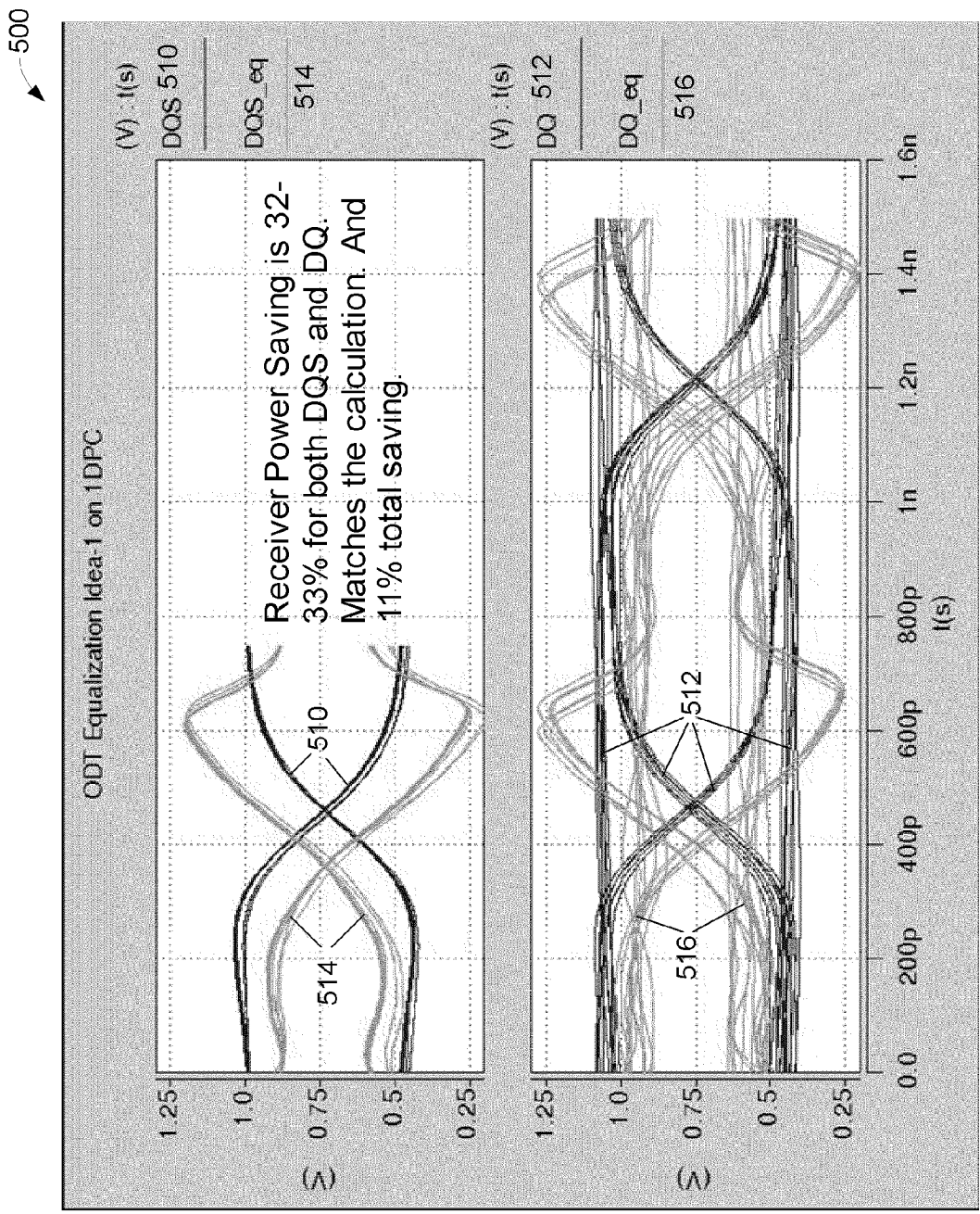
FIG. 5 shows a comparison of signal integrity for one design embodiment of the invention as shown, for example, in the schematic in FIG. 4B versus an existing design.

FIG. 5 shows a comparison of signal integrity for one embodiment of the invention, as shown for example in FIG. 4B versus an existing design FIG. 4A.

Plots named DQS 510 and DQ 512 in blue color are the ones based on FIG. 4A. Plots named DQS_eq 514 and DQ_eq 516 in green are the ones based on FIG. 4B. The plots show that the signal integrity is intact for both the strobe (DQS) and the data (DQ) signal during the signal switching event. The vertical eye for the equalization scheme looks more closed after the signal transition has occurred, which does not matter as long as it does not cross the reference voltage, which in our case is half VDD, which is 0.75V. Thus we are well above the reference voltage.

Figure 6:
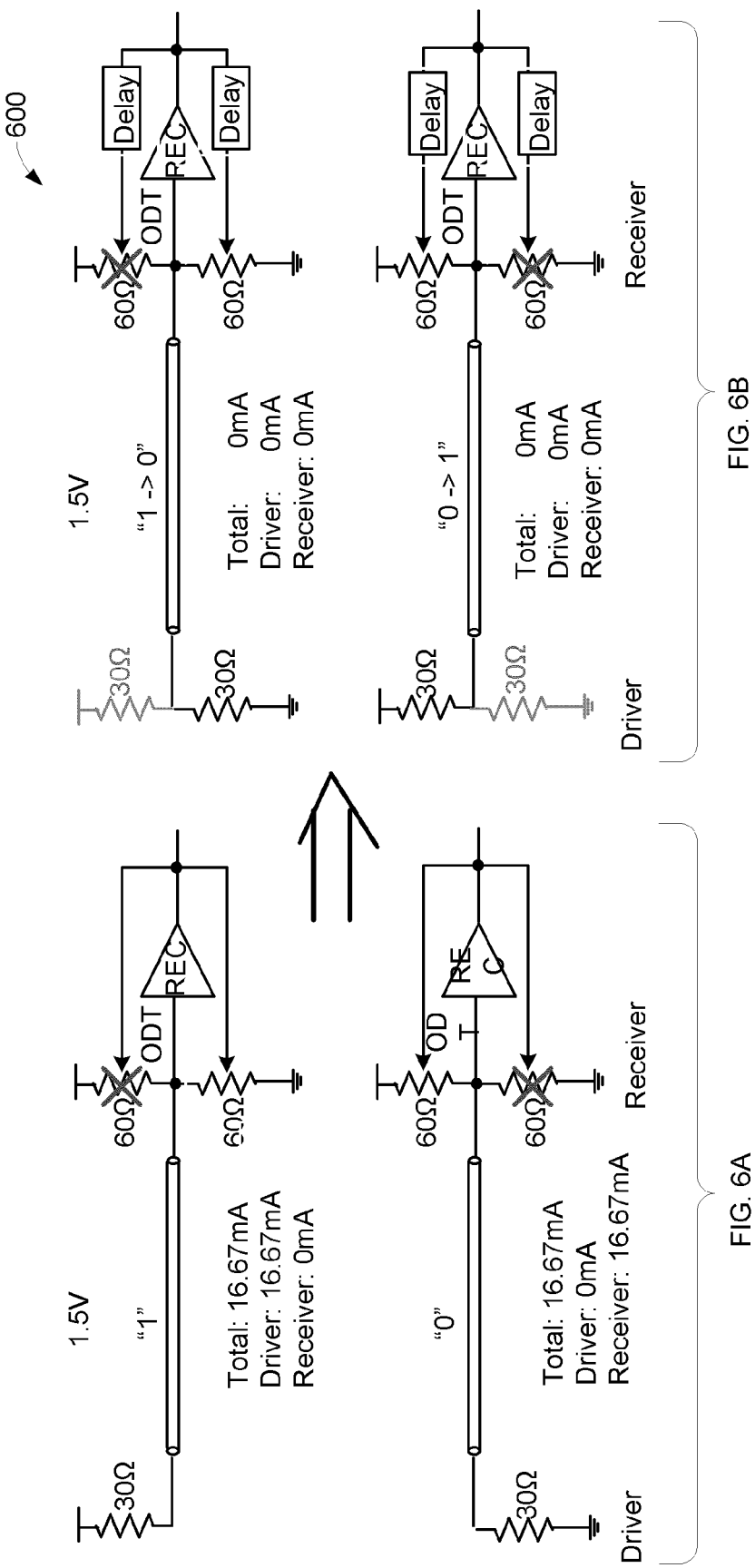
FIG. 6 illustrates another embodiment of the invention showing a schematic to implement an improved equalization based ODT modification technique to improve power savings.

FIG. 6B illustrates, generally at 600, another embodiment of the invention to implement a proposed equalization based ODT modification technique to improve power savings. FIG. 6A is the same as FIG. 4B which is a simpler implementation of an equalization based ODT scheme. We can achieve further power reduction by adding a delay to turn OFF the termination resistors. This also results in a better vertical eye opening during the signal switching event. The delay added should be equal to the bit interval minus the receiver and the termination resistor delay.

Figure 7:
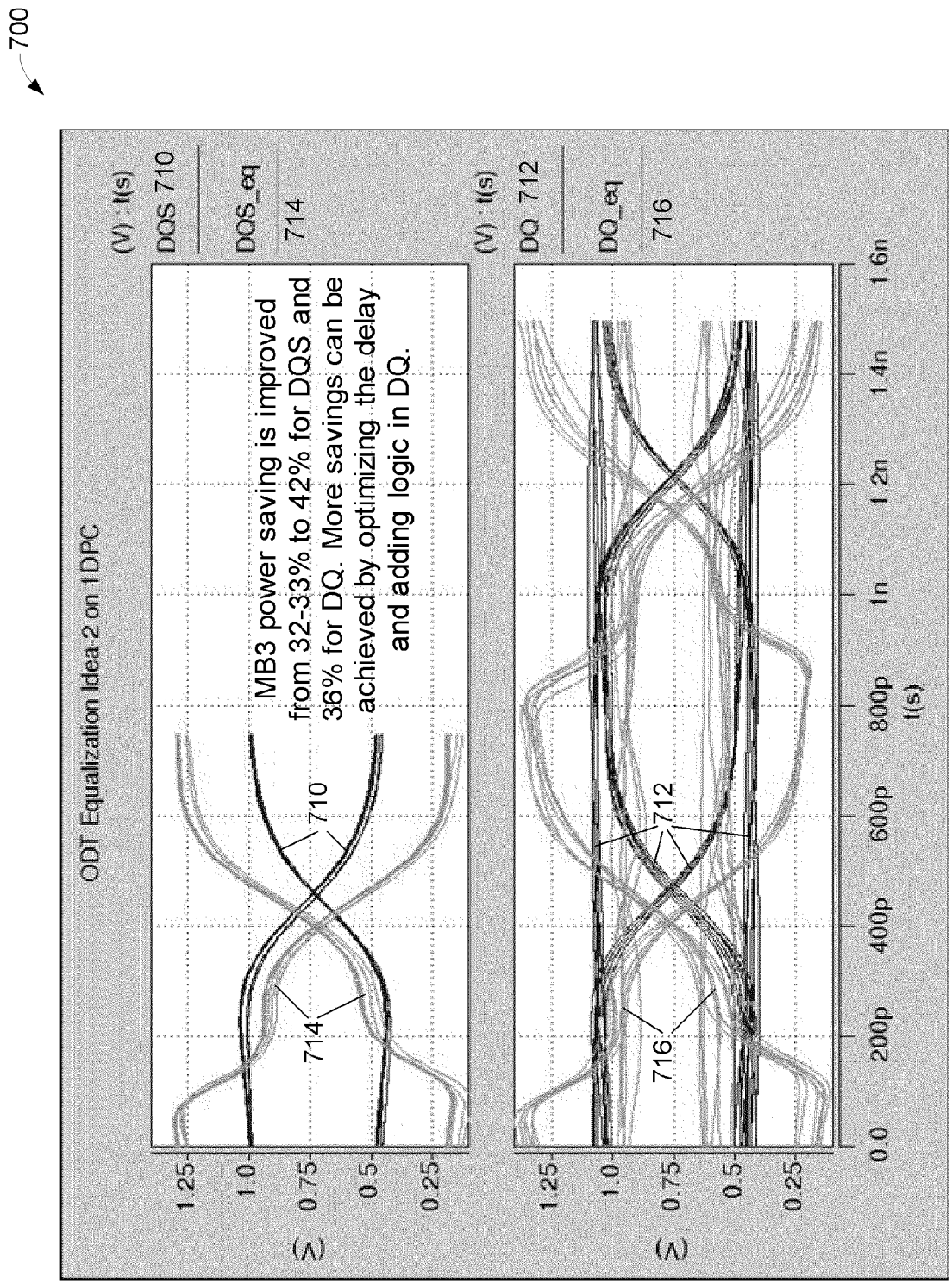
FIG. 7 shows a comparison of signal integrity for one embodiment of the invention, for example, as shown in the schematic in FIG. 6B versus an existing design.

FIG. 7 shows a comparison of signal integrity for the proposed design FIG. 6B versus the design for the schematic shown in FIG. 4A.

Plots named DQS 710, DQ 712 in blue color are the ones based on FIG. 4A. Plots named DQS_eq 714, DQ_eq 716 in green are the ones based on FIG. 6B. The plots show that the signal integrity is intact for both the strobe (DQS) and the data (DQ) signal during the signal switching event. The vertical eye for the equalization scheme looks more open during a signal switching event due to the addition of the delay to disable the resistor.

FIG. 8 shows, generally at 800, various embodiments of the invention.

FIG. 9 shows, generally at 900, various embodiments of the invention.

While the above description deals with ODT, it is to be understood that the invention is not so limited and that the techniques described herein may be used wherever an electrical termination may be needed, for example, but not limited to, a printed circuit board (PCB), substrates other than silicon—such as ceramics, microwave terminations, etc. For example, the techniques disclosed may be used on a backplane which may be a PCB, a wire wrap, a busbar, etc.

Thus a method and apparatus for an equalized On-Die Termination (ODT) circuit have been described.

Figure 1:
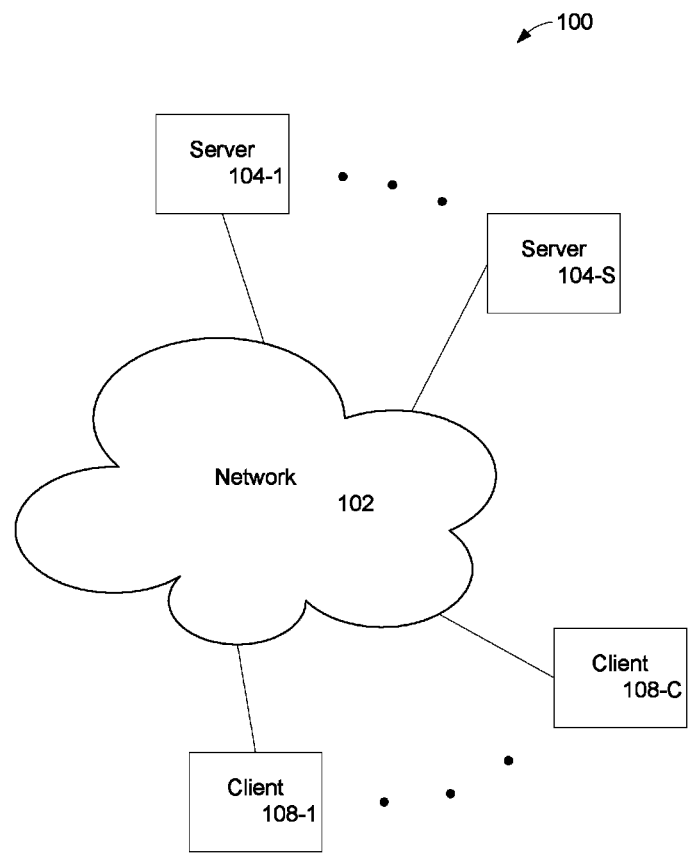
FIG. 1 illustrates a network environment in which the method and apparatus of the invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
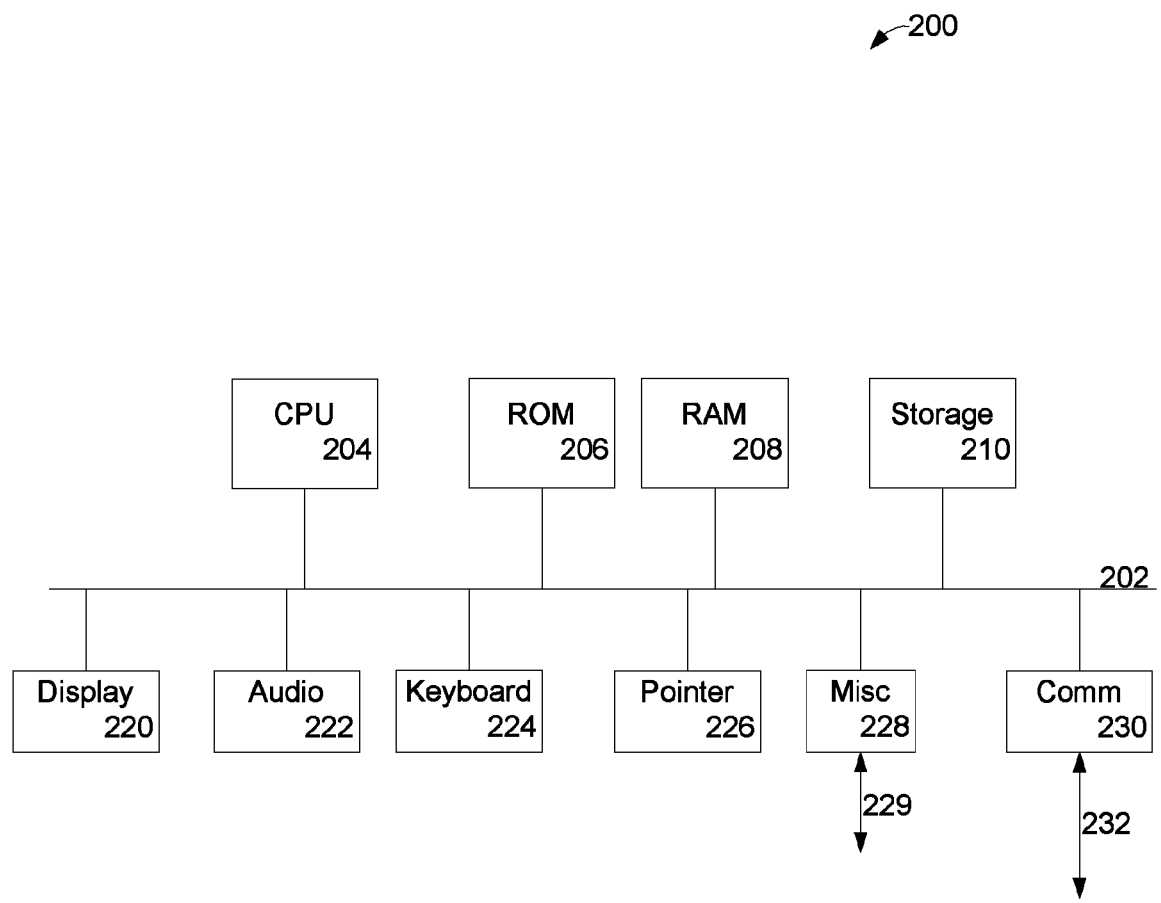
FIG. 2 is a block diagram of a computer system in which some embodiments of the invention may be used.
Figure 3:
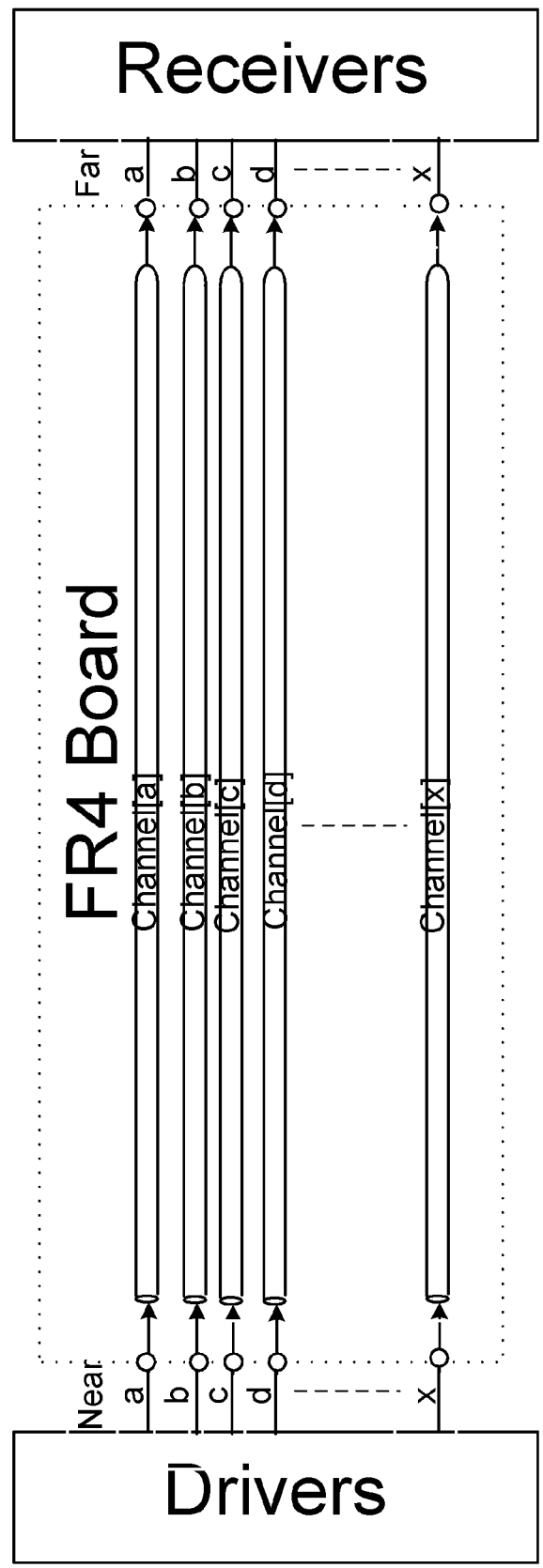
FIG. 3 illustrates a high-speed communication platform with drivers, receivers, and channels.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio 222, keyboard 224, pointer 226, miscellaneous input/output (I/O) devices 228, link 229, communications 230, and port 232. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; mechanical, electrical, optical, acoustical or other forms of non-transitory signals.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as ""substantially equal" is used to indicate that they are for all practical purposes equal.

It is to be understood that in any one or more embodiments of the invention where alternative approaches or techniques are discussed that any and all such combinations as might be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for an equalized On-Die Termination (ODT) circuit have been described.

What is claimed is:

1. A method comprising:
   terminating a receiver input to a positive potential through a first controllable impedance;
   terminating said receiver input to a ground potential through a second controllable impedance;
   communicating a receiver output to said first controllable impedance;
   communicating said receiver output to said second controllable impedance;
   storing in said receiver a previous state of said receiver; and wherein said communicating a receiver output to said first controllable impedance is coupling directly said receiver output to a control input on said first controllable impedance.

2. The method of claim 1 wherein said communicating a receiver output to said second controllable impedance is coupling directly said receiver output to a control input on said second controllable impedance.

* * * * *